United States Patent [19]

Ando et al.

[11] Patent Number: 5,216,112
[45] Date of Patent: Jun. 1, 1993

[54] PHENOLIC RESIN AND METHOD FOR PREPARING SAME

[75] Inventors: Shinji Ando; Yukio Fukui; Shigeru Iimuro, all of Nagoya, Japan

[73] Assignee: Mitsui Toatsu Chemicals, Inc., Tokyo, Japan

[21] Appl. No.: 745,422

[22] Filed: Aug. 15, 1991

[30] Foreign Application Priority Data

| Aug. 20, 1990 | [JP] | Japan | 2-216984 |
| Aug. 20, 1990 | [JP] | Japan | 2-216985 |
| Oct. 2, 1990 | [JP] | Japan | 2-262984 |
| Mar. 6, 1991 | [JP] | Japan | 3-039940 |

[51] Int. Cl.$^5$ .................. C08G 8/04; C08G 14/04
[52] U.S. Cl. ................... 528/157; 528/129; 528/144; 528/165
[58] Field of Search ............ 528/129, 165, 144, 157

[56] References Cited

U.S. PATENT DOCUMENTS

| 2,965,611 | 12/1960 | Schwarzer | 260/47 |
| 2,972,599 | 2/1961 | Guest et al. | 260/47 |
| 3,320,213 | 5/1967 | Smith | 528/165 |
| 3,384,618 | 5/1968 | Inoto | 528/129 |
| 3,485,797 | 12/1969 | Robins | 528/165 |
| 3,936,510 | 2/1976 | Harris et al. | 528/110 |

FOREIGN PATENT DOCUMENTS

| 47-15111 | 5/1972 | Japan . |
| 51-45315 | 12/1976 | Japan . |
| 57-74319 | 5/1982 | Japan . |

OTHER PUBLICATIONS

Patent Abstracts of Japan, vol. 13, No. 308, Jul. 14, 1989.
Patent Abstracts of Japan, vol. 10, No. 339, Nov. 15, 1986.

Primary Examiner—John Kight, III
Assistant Examiner—Richard L. Jones
Attorney, Agent, or Firm—Burns, Doane, Swecker & Mathis

[57] ABSTRACT

A phenolic resin can be obtained by a condensation reaction between a specific trifunctional aromatic compound and a phenolic compound. This resin can be reacted with a curing agent such as a hexamine to give cured articles having excellent heat resistance, electrical properties, wear resistance and chemical resistance, and the phenolic resin is also much more excellent in curing reactivity as compared with conventional techniques.

9 Claims, 5 Drawing Sheets

PHENOLIC RESIN AND METHOD FOR PREPARING SAME

BACKGROUND OF THE INVENTION (i) Field of the Invention

The present invention relates to a novel phenolic resin which can be utilized in many fields as a friction material, a molding material, a coating material, a raw material for an epoxy resin, a curing agent for an epoxy compound or the like, and a method for preparing this phenolic resin.

More specifically, the present invention relates to a novel phenolic resin having excellent heat resistance, electrical properties, wear resistance and chemical resistance and the like as well as a good curing reactivity.

(ii) Description of the Related Art

In general, a phenolic resin is a resin having excellent heat resistance, electrical properties, wear resistance and chemical resistance, and thus it plays an industrially important role. In recent years, however, phenolic resins having further improved characteristics are desired with the advancement of techniques in the concerned fields, and various resins having different structures have been suggested.

For example, Japanese Patent Publication No. 47-5111 discloses a low-molecular weight polymer named the so-called Friedel-Crafts resin, which can be obtained by a condensation reaction of an aralkyl compound such as α,α'-dimethoxy-p-xylene and a phenol.

Furthermore, Japanese Patent Application Laid-open No. 57-74319 suggests a method for preparing a Friedel-Crafts resin, i.e., a phenol aralkyl resin having a high melting point and a reduced cold flow, and this method is characterized by controlling the aldehyde content and the acetal content in an aralkyl ether compound containing 50 mol % or more of a difunctional aromatic compound, such as α,α'-dimethoxy-p-xylene and the like in the case of the preparation of the Friedel-Crafts resin by a condensation reaction of an aralkyl compound and a phenol.

However, when this kind of Friedel-Crafts type phenolic resin is reacted with a curing agent, for example, hexamethylenetetramine (hereinafter referred to simply as "hexamine"), the resultant cured resin has greater heat resistance as compared with a cured product obtained from a phenolic novolak resin, but the Friedel-Crafts resin has a large drawback that the productivity of the molded products thereof is low, since the curing reactivity of the resin with the hexamine is low.

For the purpose of removing this drawback, Japanese Patent Publication 51-45315 has a method of adding a curing accelerator such as salicylic acid. However, this method brings about blisters on the surfaces of the molded articles sometimes, and it is inconveniently difficult to obtain the molded articles having a uniform shape.

An object of the present invention is to provide a phenolic resin by which the above-mentioned problems can be solved and which has excellent physical properties such as heat resistance, electrical properties, wear resistance and chemical resistance as well as a good curing reactivity, and another object of the present invention is to provide a method for preparing the above-mentioned phenolic resin.

SUMMARY OF THE INVENTION

Briefly speaking, the present invention is concerned with the production of a phenolic resin by reacting a specific trifunctional aromatic compound with a phenolic compound to crosslink the latter with a trifunctional aromatic nucleus residue. The thus obtained phenolic resin, when reacted with a curing agent, provides cured articles having excellent heat resistance, electrical properties, wear resistance and chemical resistance as well as good curing reactivity.

The first aspect of the present invention is directed to a method for preparing a phenolic resin which comprises the step of reacting a trifunctional aromatic compound represented by the formula (1)

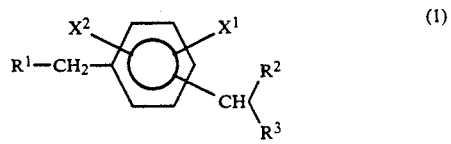

wherein each of $R^1$, $R^2$ and $R^3$ is independently a hydroxyl group, a halogen atom or a lower alkoxy group having 3 or less carbon atoms, and particularly both of $R^2$ and $R^3$ may be replaced with one oxygen atom; and each of $X^1$ and $X^2$ is independently a hydrogen atom, a halogen atom or an alkyl group with a phenolic compound in a ratio of 1 mol of the former to 2–30 mols of the latter. This reaction is conveniently carried out in the presence of an acidic catalyst, and the above-mentioned phenolic compound is preferably phenol or cresol.

The second aspect of the present invention is directed to a phenolic resin having good curing reactivity in which a phenolic compound is crosslinked with a trifunctional aromatic residue represented by the formula (2)

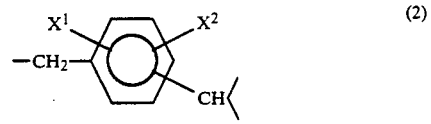

wherein each of $X^1$ and $X^2$ is independently a hydrogen atom, a halogen atom or an alkyl group). It is preferable from the viewpoint of the object of the present invention that the number average molecular weight of this resin is in the range of from 350 to 2000.

BRIEF DESCRIPTION OF THE DRAWINGS

In FIG. 1, numerals of 1, 2, 3 and 4 denote the fractions 1, 2, 3 and 4, respectively.

DETAILED DESCRIPTION OF THE INVENTION

Figure 1:
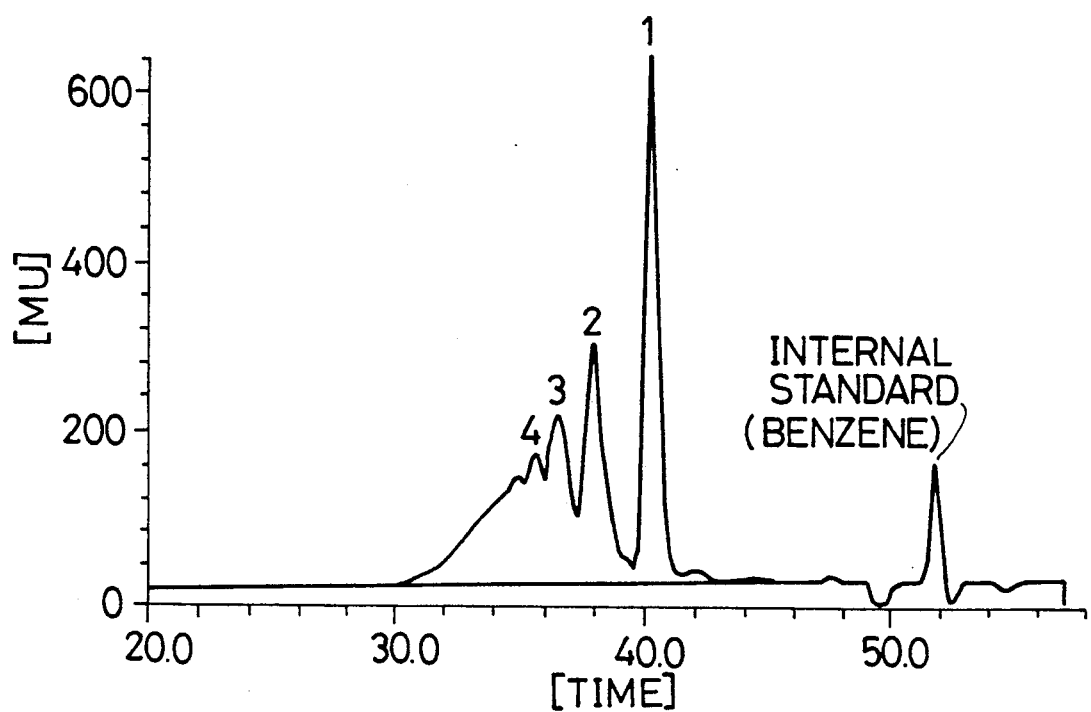
FIG. 1 shows a GPC chart of a resin A.
Figure 2:
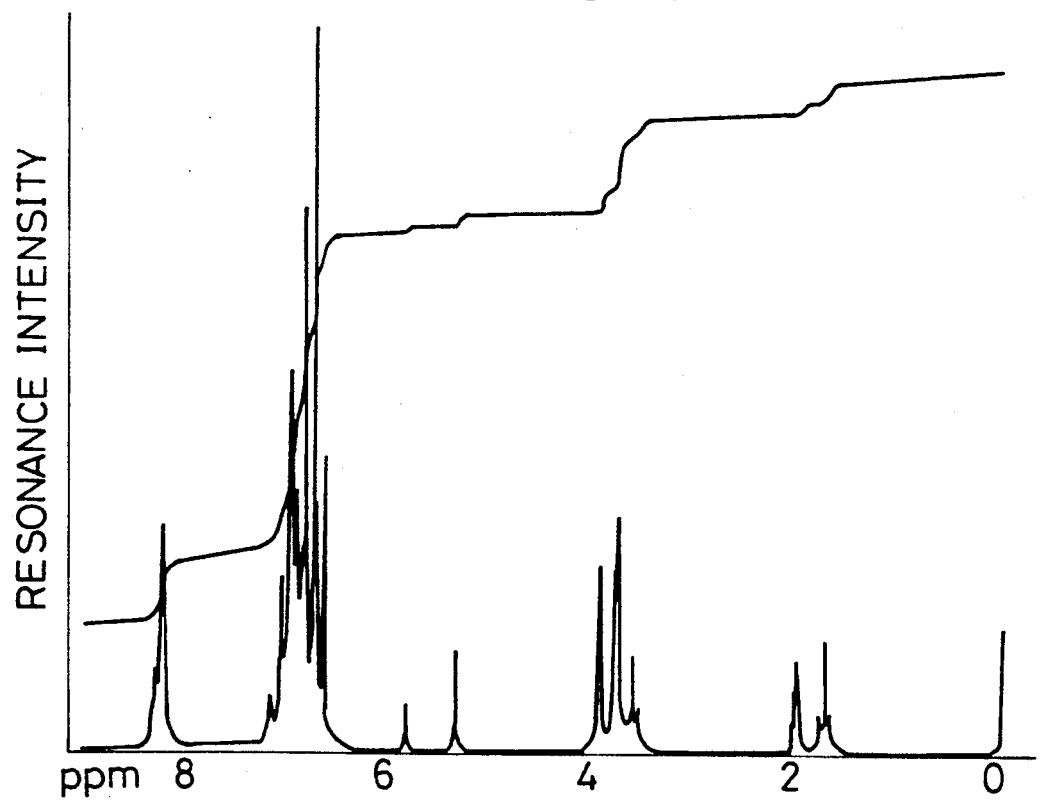
FIG. 2 shows an NMR spectrum of the fraction 1 of the resin A.
Figure 3:
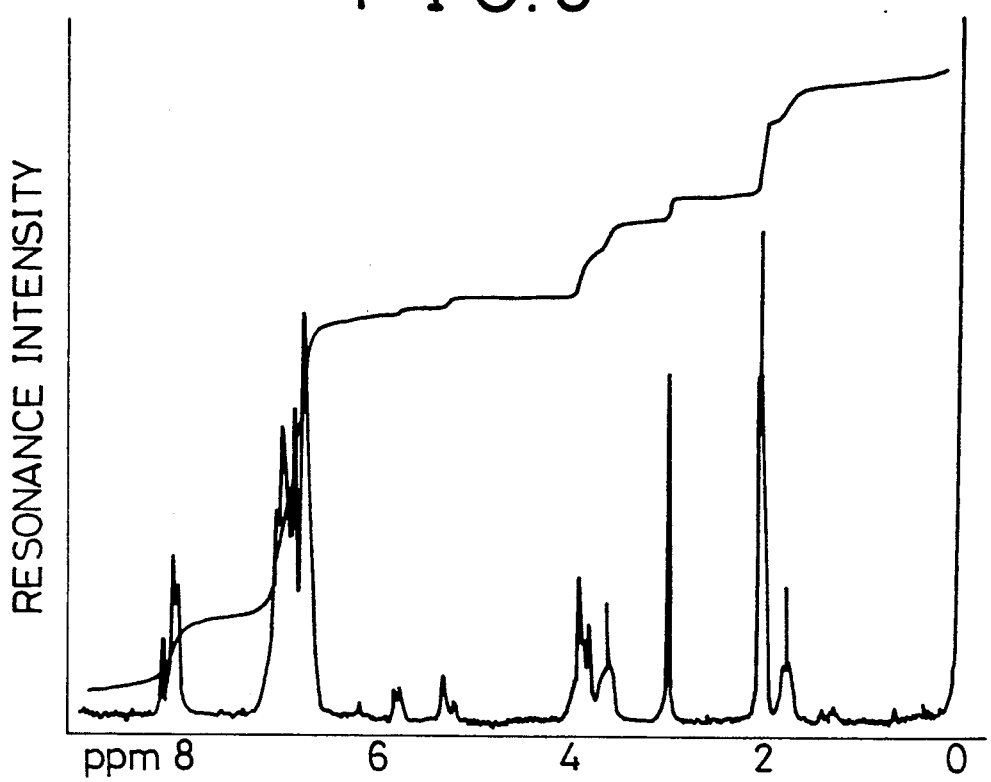
FIG. 3 shows an NMR spectrum of the fraction 2 of the resin A.
Figure 4:
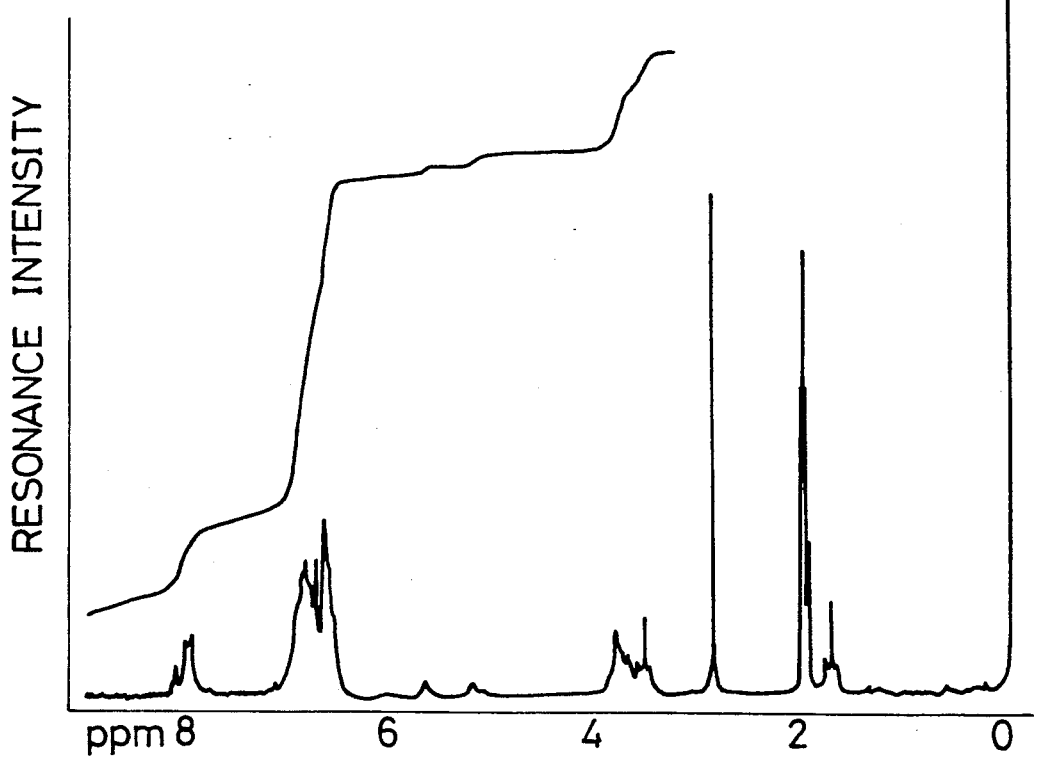
FIG. 4 shows an NMR spectrum of the fraction 3 of the resin A.
Figure 5:
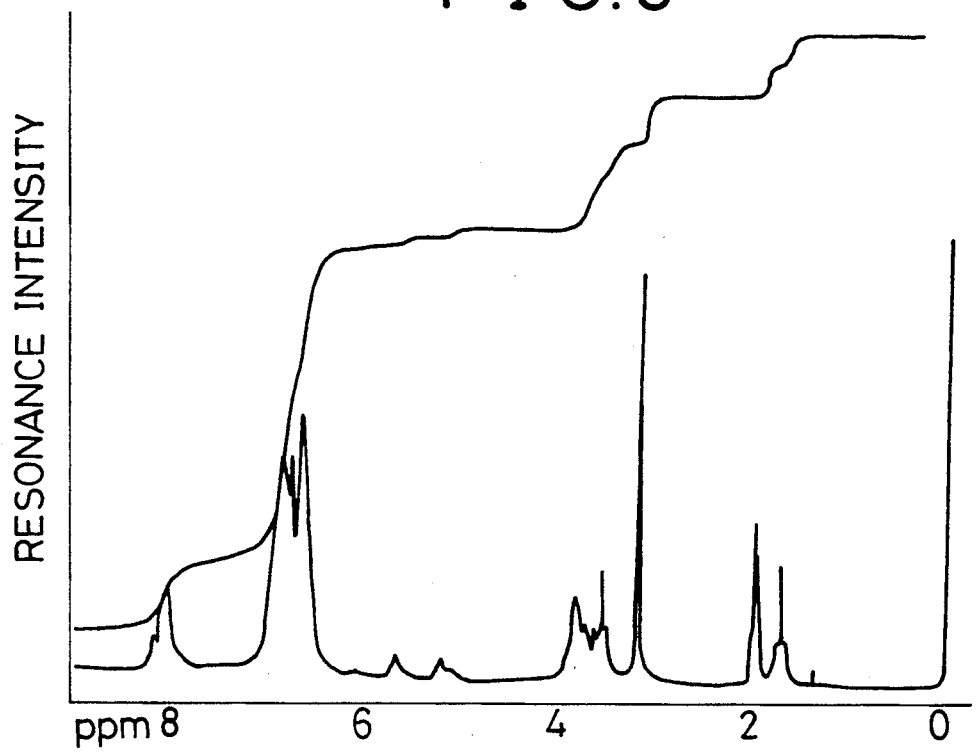
FIG. 5 shows an NMR spectrum of the fraction 4 of the resin A.
Figure 6:
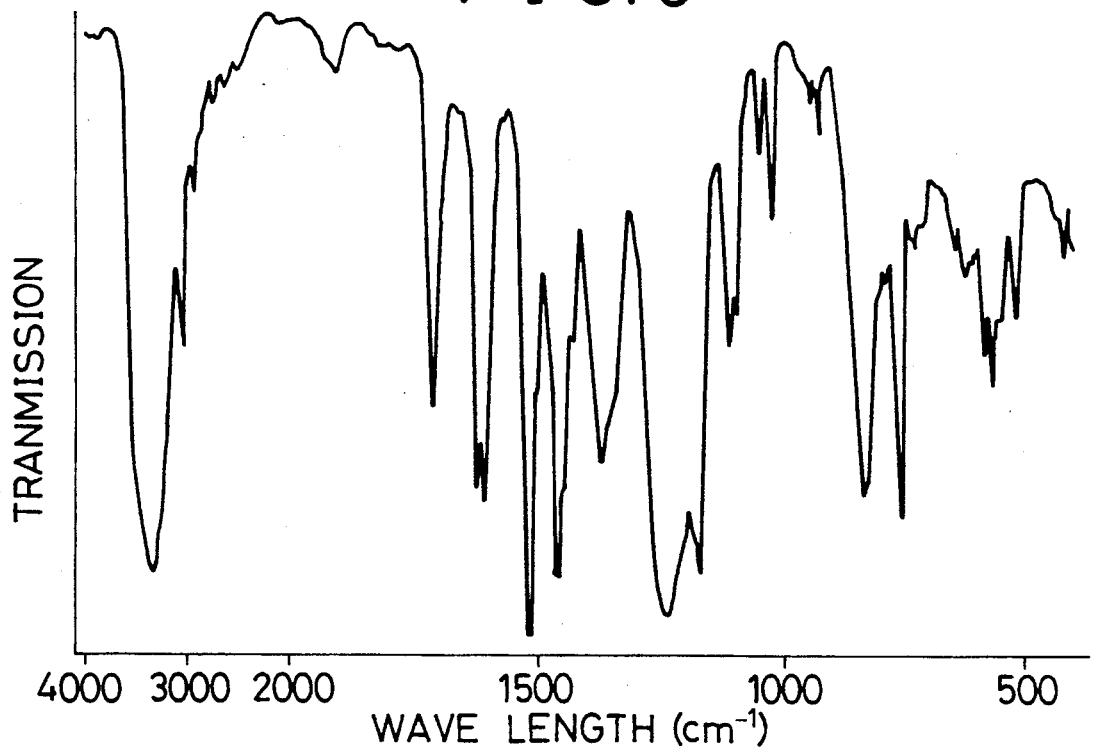
FIG. 6 shows an IR spectrum of the fraction 1 of the resin A.
Figure 7:
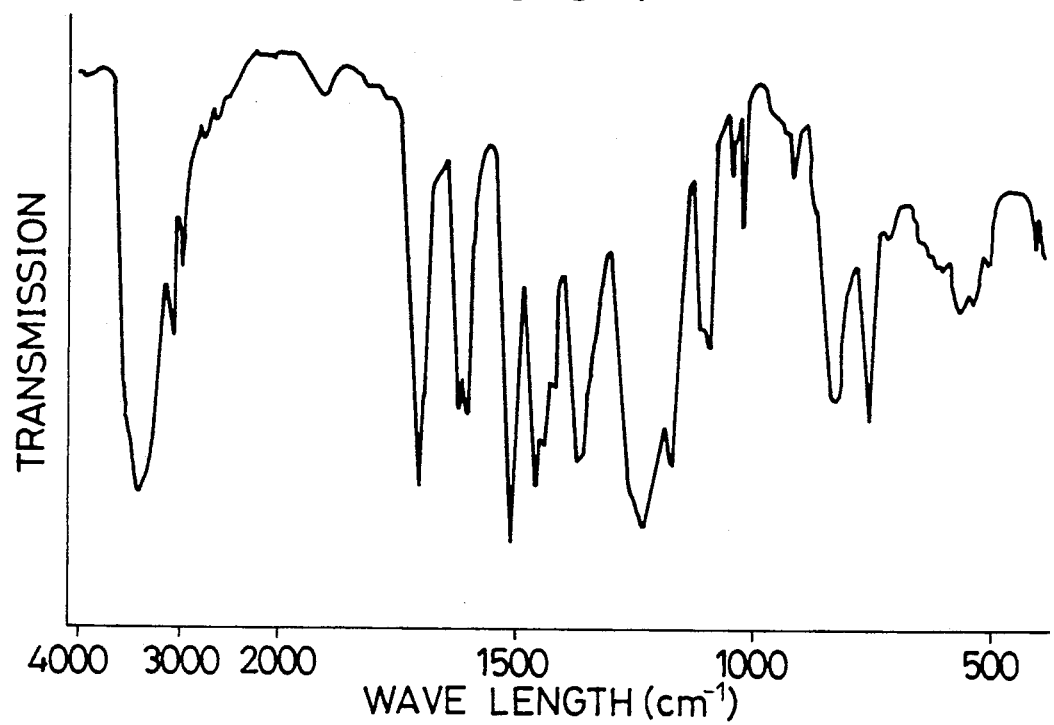
FIG. 7 shows an IR spectrum of the fraction 2 of the resin A.
Figure 8:
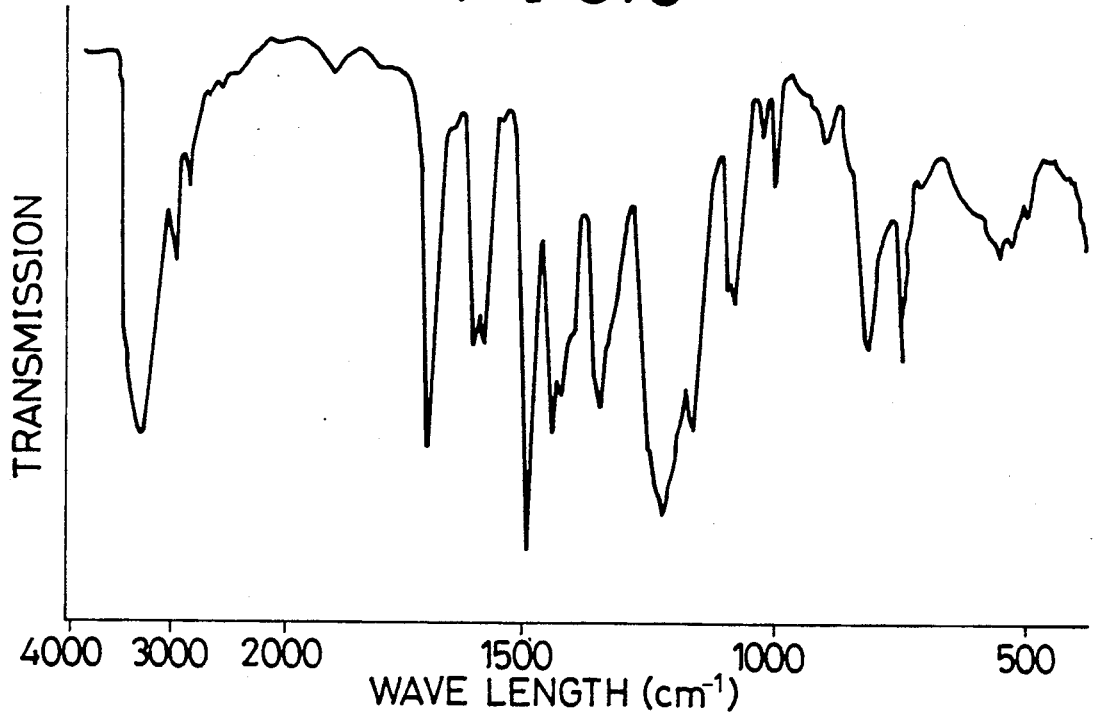
FIG. 8 shows an IR spectrum of the fraction 3 of the resin A.
Figure 9:
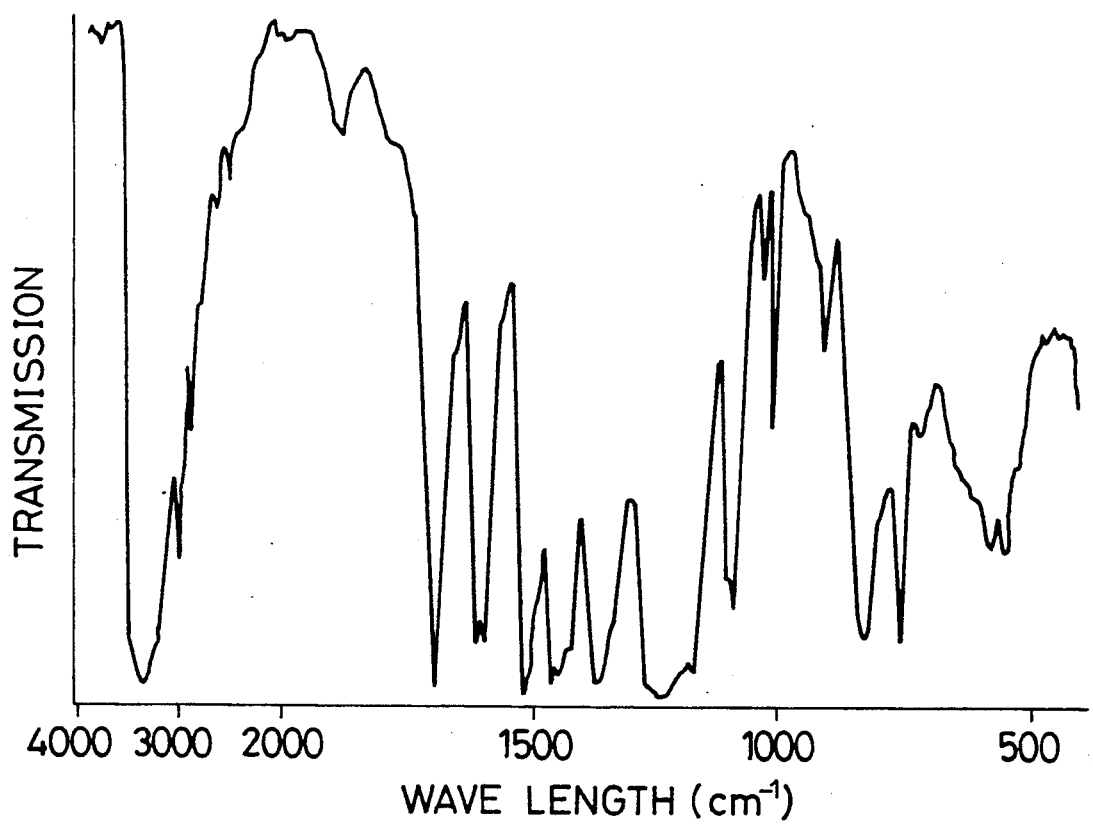
FIG. 9 shows an IR spectrum of the fraction 4 of the resin A.

A phenolic resin of the present invention is remarkably excellent in heat resistance similar to a known Friedel-Crafts resin as compared with usual phenolic resins such as novolak type phenolic resins. For example, cured articles obtained by curing the phenolic resin of the present invention with a hexamine are stable even at 400° C. or more, and the weight reduction ratio of these cured articles at 500° C. is low, which means that they are hard to bring about heat deterioration. On the contrary, in cured articles obtained by curing a known novolak type phenolic resin with the hexamine, thermal decomposition occurs abruptly at about 300° C.

Furthermore, with regard to the change of bending strength with time at 250° C. of the molded articles obtained by adding an inorganic filler, the molded articles from the phenolic resin of the present invention have a bending strength retention of 80% or more after 200 hours, but in the case of the molded articles from the known novolak type phenolic resin, the bending strength retention is nearly zero after 200 hours. In addition, the dimensional change and weight change with time of the molded articles from the phenolic resin of the present invention are also much lower as compared with those from usual novolak type phenolic resin.

According to evaluated values at 160° C. by the use of a curelasto meter, the curing reaction of the phenolic resin of the present invention with a curing agent is several times as fast as that of the known Friedel-Crafts resin. This is attributable to the difference of molecular structures. That is, the phenolic resin of the present invention has a structure in which a phenolic compound is crosslinked with a trifunctional aromatic nucleus residue, but the known Friedel-Crafts resin has the structure crosslinked with a difunctional aromatic nucleus residue.

The known Friedel-Crafts resin particularly disclosed in Japanese Patent Application Laid-open No. 57-74319 will be hereafter compared with the resin of the present invention in point of constitution. Both the resins can be prepared by a condensation reaction of a polyfunctional aromatic nucleus (benzene nucleus) compound with an excess phenolic compound. In the known resin, at least 50 mol % of aralkylene diether is required, and the trifunctional or more polyfunctional aromatic compound is reacted with the phenolic compound and an additional ether composition. On the contrary, in the present invention, a specific trifunctional component is used as the polyfunctional aromatic component which is reacted with the phenolic compound, and a difunctional component which can be added to this specific trifunctional component is used in a such amount that a molar ratio of the trifunctional component to the difunctional component is 3 to 2 or less. In other words, the amount of the trifunctional component is 60 mol % or more, and thus the amount of the difunctional component cannot exceed 40 mol %. This restriction makes a difference between the resin of the present invention from the known resin.

If the above-mentioned conditions cannot be met, the curing reactivity of the resin according to the present invention deteriorates below a lower limit, so that the object of the present invention cannot be achieved.

As described above, the phenolic resin of the present invention has the good curing reactivity, and therefore it can be used as a curing agent for an epoxy compound. In addition, the cured articles obtained therefrom have good physical properties of heat resistance and the like. For example, the cured articles obtained by curing the epoxy compound (EOCN) of ortho-cresol-novolak with the phenolic resin of the present invention have higher glass transition temperatures (Tg) as compared with cured articles obtained by curing the same with a phenol-novolak resin, and have low moduli of elasticity and low water absorption ratios.

An epoxide prepared from the phenolic resin of the present invention as a raw material can be combined with various curing agents to provide cured articles having the high glass transition temperatures (Tg), low moduli of elasticity and low water absorption ratios.

A manufacturing method of the phenolic resin of the present invention will be described in detail. A phenolic compound such as phenol or cresol and a trifunctional aromatic compound such as $\alpha,\alpha,\alpha'$-trichloroxylene or $\alpha,\alpha,\alpha'$-trimethoxyxylene were placed in a predetermined molar ratio in a reaction vessel equipped with a stirrer, a partial condenser, a total condenser, a temperature controller and the like. Next, if necessary a predetermined amount of hydrochloric acid, diethyl sulfate or the like is introduced thereinto as a catalyst, and reaction is then carried out at a predetermined temperature under atmospheric pressure or reduced pressure with stirring to crosslink the phenolic compound with the trifunctional aromatic compound, thereby obtaining a phenolic resin or a resin composition containing this resin as the main component.

Examples of the trifunctional aromatic compound which can be used in the present invention, i.e., compound represented by the formula (1), include $\alpha,\alpha,\alpha'$-trihaloxylenes such as $\alpha,\alpha,\alpha'$-trichloroxylene and $\alpha,\alpha,\alpha'$-tribromoxylene, $\alpha,\alpha,\alpha'$-trialkoxyxylene such as $\alpha,\alpha,\alpha'$-trimethoxyxylene and $\alpha,\alpha,\alpha'$-triethoxyxylene, hydroxymethylbenzaldehyde, alkoxymethylbenzaldehyde and halomethylbenzaldehyde.

Each of these aromatic compounds may have an aromatic nucleus combined with a halogen atom such as fluorine, chlorine, bromine or iodine, or an alkyl group such as a methyl group or an ethyl group.

In the above-mentioned $\alpha,\alpha,\alpha'$-trichloroxylene, any of ortho-, meta- and para-xylenes is acceptable.

In the above-mentioned $\alpha,\alpha,\alpha'$-trialkoxyxylene, any of methoxy, ethoxy, 1-propoxy and 2-propoxy is acceptable, and any of ortho-, meta- and para-xylenes is also acceptable. Thus, all isomers comprising various combinations of these groups can be exemplified as the usable compounds.

Examples of the above-mentioned hydroxymethylbenzaldehyde include o-hydroxymethylbenzaldehyde, m-hydroxymethylbenzaldehyde and p-hydroxymethylbenzaldehyde.

In the present invention, the aforesaid trifunctional aromatic compound, i.e., the compound represented by the formula (1) can be used even if it is not always pure, as long as this compound is contained in a ratio of 60 mol % or more. The content of the trifunctional aromatic compound is preferably not less than 70 mol %, more preferably not less than 80 mol %. When the content of the trifunctional aromatic compound is less than 60 mol %, cured articles obtained by curing the prepared phenolic resin are substantially equal to those obtained by curing a resin containing 60 mol % or more of the above-mentioned compound in points of physical properties such as heat resistance, electrical properties, wear resistance and chemical resistance, but the curing reactivity of the phenolic resin with a curing agent deteriorates, so that the object of the present invention cannot be achieved.

Compounds which may be contained in an amount of less than 40 mol % in the trifunctional aromatic compound are by-products formed during the manufacture of the trifunctional aromatic compound, i.e., the compound represented by the formula (1), and other compounds to be added for various purposes can also be contained therein, as long as they do not substantially affect the object of the present invention. In particular, $\alpha,\alpha,\alpha'$-trichloroxylene which can be used as the trifunctional aromatic compound can be prepared by chlorinating one or a mixture of two or more of o-xylene, m-xylene and p-xylene. For example, it can be prepared by reacting xylene with molecular chlorine in the presence of light and/or a peroxide series radical initiator or an azo series radical initiator.

The reaction for chlorinating xylene is a successive reaction, and it is generally well known that the composition of the product can be controlled by a molar ratio of chlorine and xylene. When the ratio of chlorine to xylene is about 3, $\alpha,\alpha,\alpha'$-trichloroxylene is formed in the largest amount in a reaction vessel, but a method in which the molar ratio of chlorine to xylene is controlled to 3 or less and low-boiling components are recycled is often utilized so as to heighten the yield of $\alpha,\alpha,\alpha'$-trichloroxylene.

In addition to the chlorinated products, $\alpha,\alpha,\alpha'$-trichloroxylene which remains in large quantities in a bottom residue in a distillation apparatus at the time of the manufacture of $\alpha,\alpha'$-dichloroxylene can also be used after purification as the raw material of the present invention.

Therefore, in the present invention, an aromatic chlorinated mixture containing 60 mol % or more of $\alpha,\alpha,\alpha'$-trichloroxylene can be used in addition to pure $\alpha,\alpha,\alpha'$-trichloroxylene. This aromatic chlorinated mixture may contain 60 mol % or more of $\alpha,\alpha,\alpha'$-trichloroxylene, by-products formed during its manufacture and other compounds which are added for various purposes.

The by-products formed during the manufacture of $\alpha,\alpha,\alpha'$-trichloroxylene include compounds each having an aromatic nucleus combined with two functional groups selected from the group consisting of a methyl group, a chloromethyl group, a dichloromethyl group and an aldehyde group, for example, $\alpha$-monohaloxylene, $\alpha,\alpha$-dihaloxylene, $\alpha,\alpha'$-dihaloxylene, $\alpha,\alpha,\alpha',\alpha'$-tetrahaloxylene or so. Furthermore, similar compounds each having an aromatic nucleus combined with 1 to 4 chlorine atoms can also be regarded as the above-mentioned by-products.

The additives which can be used in such an amount as to not substantially affect the object of the present invention are benzaldehyde, terephthalaldehyde and the like for adjusting the softening point, and they may be added so that the concentration of $\alpha,\alpha,\alpha'$-trichloroxylene is not below 60 mol %. In addition, the by-products formed during the manufacture of $\alpha,\alpha,\alpha'$-trichloroxylene may be added in a suitable amount, provided that the concentration of $\alpha,\alpha,\alpha'$-trichloroxylene is not below 60 mol %.

In the present invention, $\alpha,\alpha,\alpha'$-trialkoxyxylene which can be used as a specific polyfunctional aromatic compound can be obtained by reacting $\alpha,\alpha,\alpha'$-trichloroxylene formed by the above-mentioned chlorinating reaction of xylene with a lower alcohol such as methanol, ethanol, 1-propanol or 2-propanol.

In the present invention, an aralkyl ether mixture containing 60 mol % or more of $\alpha,\alpha,\alpha'$-trialkoxyxylene can also be used, not to mention pure $\alpha,\alpha,\alpha'$-trialkoxyxylene. This aralkyl ether mixture contains 60 mol % or more of $\alpha,\alpha,\alpha'$-trialkoxyxylene, by-products formed during its preparation and/or compounds which are added for various purposes.

The by-products formed during the manufacture of $\alpha,\alpha,\alpha'$-trialkoxyxylene include compounds each having an aromatic nucleus combined with two functional groups selected from the group consisting of a methyl group, an alkoxymethyl group, an aldehyde group and an acetal group, for example, $\alpha,\alpha'$-dialkoxyxylene, methylbenzaldehyde, alkoxymethylbenzaldehyde, terephthalaldehyde, or so. Furthermore, similar compounds each having an aromatic nucleus combined with 1 to 4 chlorine atoms also are by-products formed during the manufacture of $\alpha,\alpha,\alpha'$-trialkoxyxylene.

Also in the case of $\alpha,\alpha,\alpha'$-trichloroxylene, the addition of benzaldehyde, terephthalaldehyde and the like is acceptable for the purpose of adjusting a softening point, provided that the concentration of $\alpha,\alpha,\alpha'$-trichloroxylene is not below 60 mol %. Furthermore, the by-products formed during the manufacture of $\alpha,\alpha,\alpha'$-trialkoxyxylene may be suitably added thereto, provided that the concentration of $\alpha,\alpha,\alpha'$-trichloroxylene is not below 60 mol %.

The hydroxymethylbenzaldehyde which is used in the present invention includes o-hydroxymethylbenzaldehyde, m-hydroxymethylbenzaldehyde and p-hydroxymethylbenzaldehyde.

This hydroxymethylbenzaldehyde can be obtained by hydrolyzing $\alpha,\alpha,\alpha'$-trihaloxylene formed by the halogenating reaction of xylene, or hydrogenating phthalaldehyde.

In the present invention, there can be used the above-mentioned pure hydroxymethylbenzaldehyde and an aromatic mixture containing hydroxymethylbenzaldehyde of the main component, by-products formed during its manufacture and/or compounds which are added for various purposes.

The amount of hydroxymethylbenzaldehyde contained in the aromatic mixture is 60 mol % or more. When the amount of hydroxymethylbenzaldehyde is less than 60 mol %, cured articles of the phenolic resin of the present invention are not so poor in physical properties such as heat resistance, electrical properties, wear resistance and chemical resistance, but the curing reactivity of the phenolic resin with a curing agent deteriorates.

The by-products formed during the manufacture of hydroxymethylbenzaldehyde include compounds each having an aromatic nucleus combined with two functional groups of a methyl group, a hydroxymethyl group, a dihydroxymethyl group and an aldehyde group, for example, methylbenzaldehyde, xylyleneglycol, terephthalaldehyde, or so. Furthermore, similar compounds each having an aromatic nucleus combined with 1 to 4 halogen atoms also are by-products formed at this time. The addition of benzaldehyde or the like is acceptable for the purpose of adjusting a softening point, and the by-products formed during the manufacture of hydroxymethylbenzaldehyde may be also suitably added thereto.

Examples of the phenolic compound which can be used in the present invention include phenol, o-cresol, m-cresol, p-cresol, 2,6-xylenol, 4-methylcatechol, catechol, resorcin, 2,2-bis(p-hydroxyphenyl)propane, bis(p-hydroxyphenyl)methane, p-ethylphenol, p-t-butylphenol, p-t-octylphenol, o-phenylphenol, m-phenylphenol, p-phenylphenol, p-aminophenol, pyrogallol, phloroglucinol, α-naphthol, α-naphthol, phenanthrol and oxyanthracene.

When the aforesaid polyfunctional aromatic compound, i.e., the compound represented by the formula (1) (hereinafter referred to as "main material") is cross-linked with the phenolic compound, the molar ratio of the aromatic nucleus in the main material to the phenolic compound is required to be 1:2-30, preferably 1:3-25. When the molar ratio is less than 2, the crosslinking reaction proceeds excessively, so that a high polymer having a number average molecular weight of 2000 or more is easily formed and gelation sometimes occurs. Conversely, when the molar ratio is in excess of 30, heat resistance deteriorates, and in consequence, the object of the present invention cannot be achieved.

The above-mentioned crosslinking reaction is preferably carried out in the presence of an acidic catalyst, but when α,α,α'-trihaloxylene, halomethylbenzaldehyde or the like is used as the main material, the crosslinking reaction proceeds even in the absence of a catalyst in some cases.

Examples of the acidic catalyst include hydrochloric acid, sulfuric acid, phosphoric acid, formic acid, oxalic acid, zinc chloride, aluminum chloride, stannic chloride, ferric chloride, boron trifluoride, cupric chloride, cupric sulfate, mercuric sulfate, mercurous sulfate, mercuric chloride, mercurous chloride, silver sulfate, sodium hydrogensulfate, methanesulfonic acid, p-toluenesulfonic acid and dialkyl sulfates having an alkyl group of 1 to 6 carbon atoms.

Examples of the dialkyl sulfate include dimethyl sulfate, diethyl sulfate and diisopropyl sulfate. These acidic catalysts may be used singly or in the form of a mixture of two or more thereof.

No particular restriction is put on the amount of the acidic catalyst, but it is preferably from 0.0001 to 10% by weight, more preferably 0.01 to 5% by weight based on the total weight of the main material and the phenolic compound.

The temperature of the crosslinking reaction depends largely upon the kinds of main material and phenolic compound, the presence of a catalyst, and the kind and amount of catalyst in the case that the catalyst is used. However, it is usually from 50° to 250° C., preferably from 70° to 200° C. When the temperature of the crosslinking reaction is less than 50° C., a long period of time is required until the crosslinking reaction has been completed, and productivity also deteriorates. Conversely, when it is in excess of 250° C., a crosslinking reaction rate is too high to control the reaction conveniently.

The reaction time depends largely upon the reaction temperature and the above-mentioned several factors, but in general, a period of from several minutes to 100 hours is required to complete the crosslinking reaction.

It is extremely desirable to discharge hydrogen halides, lower alcohols, water and the like formed during the progress of the reaction from the system through a vent line. The reaction is carried out usually under atmospheric pressure, preferably under reduced pressure. It is unnecessary to purposely remove air from the reaction vessel prior to the start of the reaction, but in the case that the reaction temperature is high, the atmosphere in the reaction vessel is preferably beforehand replaced with an inert gas in order to prevent the resin from being deteriorated by oxidation.

For the purpose of accelerating the removal of hydrogen halides, lower alcohols, water and the like formed during the reaction from the system, for example, an inert gas may be continuously introduced into the reaction vessel.

After the reaction, the excess phenolic compound, if necessary, is removed by vacuum distillation or another means to obtain the phenolic resin of the present invention.

The thus obtained phenolic resin of the present invention is usually cooled to solidify itself, and the resultant solid is then ground. Afterward, a curing agent such as the hexamine and other additives are suitably added to and then mixed with the solid grains to form cured articles.

The amount of the hexamine to be added as the curing agent is from 5 to 20 parts by weight based on 100 parts by weight of the phenolic resin of the present invention. As the curing agent, the hexamine is most desirable, but there can also be employed curing agents such as quinone, chloroaniline, anhydrous formaldehyde and ethylenediamineformaldehyde which are used for known phenolic resins.

In preparing the cured articles, there may also be added various fillers, a lubricant such as calcium stearate in addition to the curing agent.

The phenolic resin and the similar phenolic resin containing the above-mentioned resin as the main component according to the present invention are very useful as molding materials and brake materials because of excellent curing reactivity. Furthermore, these resins of the present invention can be epoxidized and then reacted with the curing agent to obtain good cured articles, and they can also be utilized as curing agents for epoxy resins.

Now, the present invention will be described in more detail with reference to preparation examples, examples and comparative examples.

PREPARATION EXAMPLE 1

Preparation of α,α,α'-trichloro-p-xylene having a purity of 90% by weight 200 g of p-xylene and 300 g of carbon tetrachloride as a solvent were placed in a 1-liter glass light reaction vessel equipped with a jacket, a reflux condenser, a stirrer, a chlorine gas blowing orifice and an internal reflection type 100 W mercury vapor lamp. Next, 400 g of chlorine were blown into the solution at a rate of 10 g/minute with stirring. Reaction temperature was adjusted to 70° C. by feeding cold water to the jacket.

Chlorides in the reaction vessel were analyzed by the use of gas chromatography. As a result and except for added carbon tetrachloride, they contained 48% by weight of α,α,α'-trichloro-p-xylene, 20% by weight of α,α'-dichloro-p-xylene, 23% by weight of α,α,α',α'-tetrachloro-p-xylene and 9% by weight of the others. In a gas discharged from the reactor, chlorine was scarcely perceived.

300 g of a sample solution were taken out from the reaction solution and then subjected to a batch type distillation by the use of a 10-step Oldershaw type distillation apparatus (glass make, plate system). A reflux ratio and a column top pressure were set to 3 and 10 mm Hg, respectively, and a fraction at column top temperatures of 135° C. or less and another fraction at column top temperatures of 155° C. or less were batched off as a fraction 1 and a fraction 2, respectively. Afterward, they were analyzed by the use of gas chromatography to inspect their compositions.

As a result, the amount of the fraction 1 was 73 g and its composition was composed of 72% by weight of $\alpha,\alpha'$-dichloro-p-xylene, 14% by weight of $\alpha,\alpha,\alpha'$-trichloro-p-xylene and 14% by weight of the others. The amount of the fraction 2 was 138 g and its composition was composed of 5% by weight of $\alpha,\alpha'$-dichloro-p-xylene, 90% by weight of $\alpha,\alpha,\alpha'$-trichloro-p-xylene, 3% by weight of $\alpha,\alpha,\alpha',\alpha'$-tetrachloro-p-xylene and 2% by weight of the others. The fraction 1 contains a large amount of $\alpha,\alpha'$-dichloro-p-xylene, and thus it can be fed to the reaction.

The fraction 2 is a mixture of chlorinated compounds containing 90% by weight of $\alpha,\alpha,\alpha'$-trichloro-p-xylene.

PREPARATION EXAMPLE 2

Preparation of $\alpha,\alpha,\alpha'$-trichloro-p-xylene having a purity of 89% by weight p-xylene was chlorinated in the presence of ultraviolet rays, and $\alpha,\alpha'$-dichloro-p-xylene was then distilled and separated from the resultant reaction mixture. Afterward, 300 g of a bottom residue (containing 40% by weight of $\alpha,\alpha'$-trichloro-p-xylene) were taken out and then subjected to batch distillation by the use of a 10-step Oldershaw type distillation apparatus (glass make, plate system).

As a result, a mixture of chlorinated compounds containing 89% by weight of $\alpha,\alpha,\alpha'$-trichloro-p-xylene was obtained.

PREPARATION EXAMPLE 3

Preparation of high-purity $\alpha,\alpha,\alpha'$-trichloro-p-xylene

The same procedure as in Preparation Example 1 was effected to obtain $\alpha,\alpha,\alpha'$-trichloro-p-xylene having a purity of 90% by weight, and the latter was then purified in a reflux ratio of 10 by the use of a 20-step Oldershaw type distillation apparatus (glass make, plate system). Rectification was repeated 3 times, thereby obtaining $\alpha,\alpha,\alpha'$-trichloro-p-xylene having a purity of 99.9% by weight or more.

PREPARATION EXAMPLE 4

Preparation of $\alpha,\alpha,\alpha'$-trimethoxy-p-xylene having a purity of 87.5% by weight 320.4 g of methanol and 13.6 g of 97% caustic soda were placed in a 500-ml glass reactor equipped with a stirrer, a reflux condenser and a dropping funnel, and 204.95 g of $\alpha,\alpha,\alpha'$-trichloro-p-xylene having a purity of 90% by weight which were obtained in the same manner as in Preparation Example 1 were added dropwise thereto in order to start reaction. A reaction temperature was adjusted by dipping a reactor in an oil bath and refluxing methanol. After the addition, this state was further maintained for 5 hours to complete the reaction. The resultant reaction solution was analyzed by the use of gas chromatography, and as a result, $\alpha,\alpha,\alpha'$-trichloro-p-xylene was not detected, and $\alpha,\alpha,\alpha'$-trimethoxy-p-xylene having a purity of 87.5% by weight was obtained.

Furthermore, impurities which were contained in the product were 4.9% by weight of $\alpha,\alpha'$-dimethoxy-p-xylene, 2.9% by weight of p-methoxymethylbenzaldehyde, 1.8% by weight of $\alpha,\alpha,\alpha',\alpha'$-tetramethoxy-p-xylene, 0.5% by weight of 2,5,6-trichloro-p-xylene, 0.6% by weight of $\alpha,\alpha'$-dimethoxy-2-chloro-p-xylene, 0.6% by weight of $\alpha$-monomethoxy-2,5-dichloro-p-xylene and 1.3% by weight of the others.

Thus, an aralkyl ether mixture having 87.5% by weight of $\alpha,\alpha,\alpha'$-trimethoxy-p-xylene was obtained.

PREPARATION EXAMPLE 5

Preparation of $\alpha,\alpha,\alpha'$-trimethoxy-p-xylene having a purity of 86% by weight p-xylene was chlorinated in the presence of ultraviolet rays, and $\alpha,\alpha'$-dichloro-p-xylene was then recovered from the resultant reaction mixture by distillation. Afterward, 300 g of a bottom residue (containing 40% by weight of $\alpha,\alpha,\alpha'$-trichloro-p-xylene) were taken out and then subjected to batch distillation by the use of a 10-step Oldershaw type distillation apparatus (glass make, plate system).

As a result, chlorinated compounds containing 89% by weight of $\alpha,\alpha,\alpha'$-trichloro-p-xylene were obtained. These chlorinated compounds were reacted with methanol in the same manner as in Preparation Example 4 to obtain an aralkyl ether mixture containing 86% by weight of $\alpha,\alpha,\alpha'$-trimethoxy-p-xylene.

PREPARATION EXAMPLE 6

Preparation of high-purity $\alpha,\alpha,\alpha'$-trimethoxy-p-xylene

The same procedure as in Preparation Example 3 was effected to obtain $\alpha,\alpha,\alpha'$-trichloro-p-xylene having a purity of 99.9% by weight or more. This product was then used as a raw material, and reaction and purification were then carried out in the same manner as in Preparation Example 4. Additional purification was performed in a reflux ratio of 10 by the use of a 20-step Oldershaw type distillation apparatus (glass make, plate system). Rectification was then repeated 3 times, thereby obtaining $\alpha,\alpha,\alpha'$-trimethoxy-p-xylene having a purity of 99.9% by weight or more.

PREPARATION EXAMPLE 7

Preparation of hydroxymethylbenzaldehyde having a purity of 85% by weight 167.0 g of sodium carbonate and 1200 g of distilled water were placed in a four-necked flask equipped with a reflux condenser, a lagged dropping funnel, a thermometer and a stirrer, and the atmosphere in the flask was replaced with nitrogen and then adjusted to 100° C. Next, 100 g of $\alpha,\alpha,\alpha'$-trichloro-p-xylene having a purity of 90% by weight obtained in the same manner as in Preparation Example 1 were added dropwise thereto over 10 minutes. After an aging reaction was carried out for 10 hours, the resultant reaction solution was analyzed by the use of gas chromatography. As a result, it was found that the reaction solution was composed of 85% by weight of p-hydroxymethylbenzaldehyde, 4.8% by weight of p-xylylene glycol, 2.8% by weight of terephthalaldehyde and 7.4% by weight of the others.

Thus, an aromatic mixture containing 85% by weight of p-hydroxymethylbenzaldehyde was obtained.

EXAMPLE 1

50 g (0.26 mol) of α,α,α'-trimethoxy-p-xylene (high-purity product) obtained in Preparation Example 6, 112.9 g (1.2 mols) of phenol and 0.08 g of diethyl sulfate were placed in a reaction vessel equipped with a stirrer, a thermometer, a partial condenser and a total condenser, and the resultant mixture was subjected to a crosslinking reaction with stirring, while maintaining the temperature at about 140° C. Methanol formed during the reaction was removed through a vent line from the system. After the reaction was carried out for about 2 hours, unreacted phenol was removed by vacuum distillation, and the remaining resinous product in the reactor was cooled.

The thus obtained reaction product which was a reddish brown solid was ground in a dry atmosphere to form a light red fine powder resin. This resin had a softening point (in accordance with JIS K-2548) of 107.5° C. This resin was named resin A.

The thus obtained resin A was dissolved in tetrahydrofuran, and its molecular weight distribution was then measured by the use of GPC. As a result, the number average molecular weight of the resin A was 630. In this connection, a GPC chart is shown in FIG. 1. Furthermore, the same solution was fractioned into 4 fractions by the use of the above-mentioned GPC. For samples of these fraction resin solutions, nuclear magnetic resonance (H-NMR) spectrum and infrared rays (IR) absorption spectrum were measured. These results are shown in FIGS. 2 to 5 and FIGS. 6 to 9, respectively. In addition, the structures of the respective fractions are shown as follows.

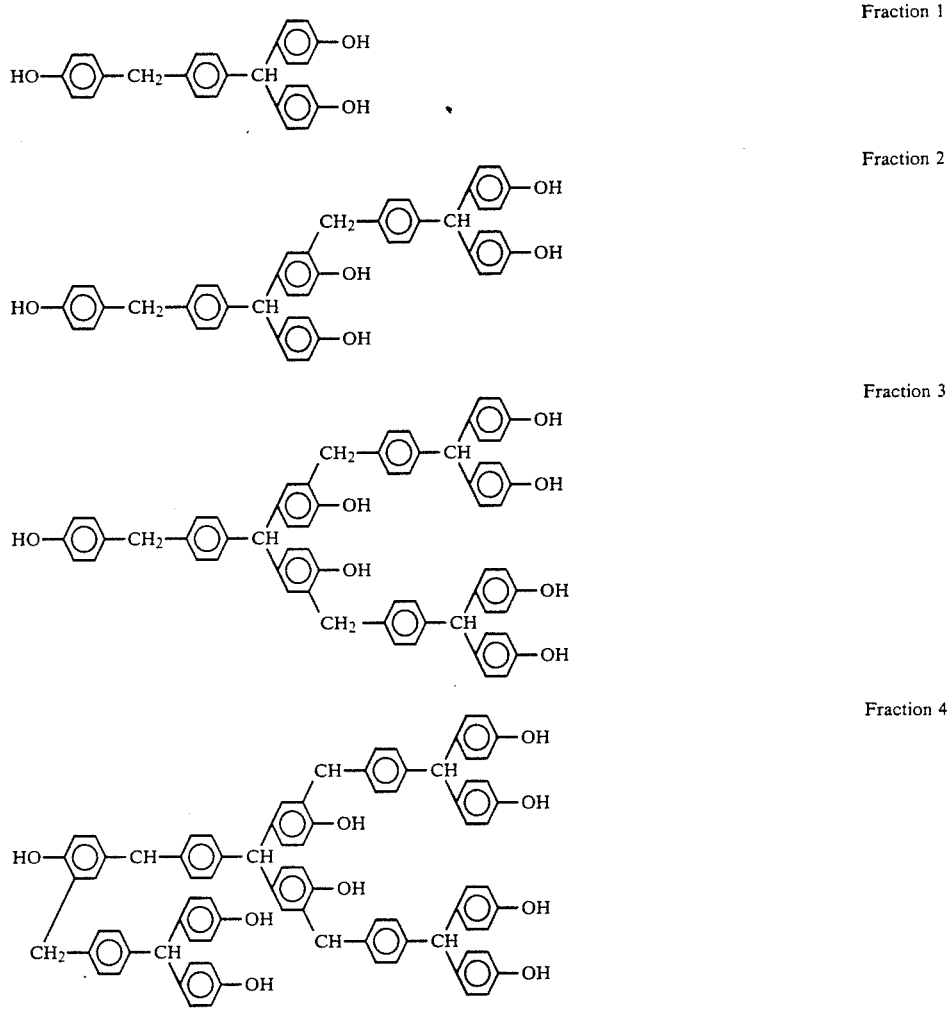

Fraction 1

Fraction 2

Fraction 3

Fraction 4

100 parts by weight of the resin A and 12 parts by weight of the hexamine were uniformly mixed to prepare a powder. The curing reactivity of this powder at 160° C. was evaluated by means of a JSR type curelasto meter. The obtained results are set forth in Table 2.

The thus prepared powder was subjected to a curing reaction at 170° C. for 1 hour in a gear oven type heater. For the resultant cured articles, heat resistance was measured by the use of a differential thermal analyzer (trade name Thermoflex, made by Rigaku Denki Co., Ltd.). For about 7 mg of the sample, weight reduction at 500° C. was measured at a temperature rise rate of 10° C./minute and at an air feed rate of 100 ml/minute. The obtained results are set forth in Table 2. In this connection, the conditions for the polymerization of the resin A are shown in Table 1 together with those for the other resins.

EXAMPLES 2 to 6, COMPARATIVE EXAMPLES 1 to 2

Resins were synthesized by the use of raw materials and catalysts shown in Table 1 by the same procedure as in Example 1. In Examples 2 to 5, $\alpha,\alpha,\alpha'$-trimethoxy-p-xylene (high-purity product) obtained in Preparation Example 6 was used, and in Example 6, $\alpha,\alpha,\alpha'$-trichloro-p-xylene (high-purity product) obtained in Preparation Example 3 was used. The thus obtained resins were named resins B to F. Reaction conditions and softening points of these resins are also set forth in Table 1.

The resins B to F obtained in Examples 2 to 6 and two kinds of commercial resins for comparison shown in Table 2 were cured in the same manner as in Example 1, and curing reactivity and heat resistance of the cured articles were evaluated. The obtained results were set forth in Table 2. As is apparent from Table 2, the phenolic resins of the present invention are extremely excellent in heat resistance and curing reactivity.

TABLE 1

|  | Ex. 1 | Ex. 2 | Ex. 3 |
| --- | --- | --- | --- |
| Raw Material | TMPX | TMPX | TMPX |
| Weight (g) of Raw Material | 50 | 50 | 50 |
| Mol (a) of Aromatic Nucleus in Raw Material | 0.26 | 0.26 | 0.26 |
| Phenolic Compound | phenol | o-cresol | phenol |
| Mol (b) of Phenolic Compound | 1.3 | 1.3 | 2.6 |
| Molar Ratio (b)/(a) | 5 | 5 | 10 |
| Catalyst | diethyl sulfate | diethyl sulfate | diethyl sulfate |
| Amount (g) of Catalyst | 0.08 | 0.19 | 0.29 |
| Reaction Temperature (°C.) | 140 | 140 | 140 |
| Reaction Time (hr) | 2 | 2 | 2 |
| Softening Point (°C.) of Resin | 108.5 | 115 | 103.8 |
| Name of Resin (Kind of Resin) | A | B | C |

|  | Ex. 4 | Ex. 5 | Ex. 6 |
| --- | --- | --- | --- |
| Raw Material | TMPX | TMPX | TCPX |
| Weight (g) of Raw Material | 50 | 50 | 50 |
| Mol (a) of Aromatic Nucleus in Raw Material | 0.26 | 0.26 | 0.24 |
| Phenolic Compound | phenol | phenol | phenol |
| Mol (b) of Phenolic Compound | 1.3 | 2.6 | 1.2 |
| Molar Ratio (a)/(b) | 5 | 10 | 5 |
| Catalyst | PTS | methane-sulfonic acid | diethyl sulfate |
| Amount (g) of Catalyst | 0.17 | 0.14 | 0.16 |
| Reaction Temperature (°C.) | 160 | 130 | 140 |
| Reaction Time (hr) | 3 | 4 | 2 |
| Softening Point (°C.) of Resin | 109.5 | 104.2 | 109.5 |
| Name of Resin (Kind of Resin) | D | E | F |

Notes:
TMPX was $\alpha,\alpha,\alpha'$-trimethoxy-p-xylene.
TCPX was $\alpha,\alpha,\alpha'$-trichloro-p-xylene.
PTS was p-toluenesulfonic acid.

TABLE 2

|  | Ex. 1 | Ex. 2 | Ex. 3 |
| --- | --- | --- | --- |
| Resin | A | B | C |
| Amount of Hexamine (wt % to resin) | 12 | 12 | 12 |
| Curing Rate[1] | 10.8 | 9.8 | 11.2 |
| Weight Reduction (%) at 500° C. | 16.5 | 16.7 | 17.1 |

|  | Ex. 4 | Ex. 5 | Ex. 6 |
| --- | --- | --- | --- |
| Resin | D | E | F |
| Amount of Hexamine (wt. % to resin) | 12 | 12 | 12 |
| Curing Rate[1] | 10.8 | 11.0 | 11.3 |
| Weight Reduction (%) at 500° C. | 16.6 | 17.3 | 17.3 |

|  | Comp. Ex. 1 | Comp. Ex. 2 |
| --- | --- | --- |
| Resin | XL-225 | No. 2000 |
| Amount of Hexamine (wt. % to resin) | 12 | 12 |
| Curing Rate[1] | 70.0 | 10.3 |
| Weight Reduction (%) at 500° C. | 18 | 35 |

Note:
[1] The curing rate was a full cure time (minutes) measured by the curelasto meter.
XL-225 was the trade name Milex XL-225 made by Mitsui Toatsu Chemicals, Inc., and it was a polymer of $\alpha,\alpha'$-dimethoxy-p-xylene and phenol.
No. 2000 was the trade name Novolak No. 2000 made by Mitsui Toatsu Chemicals, Inc., and it was a polymer of formalin and phenol.

EXAMPLE 7

50 g (0.26 mol in terms of the total amount of aromatic nuclei) of an aralkyl ether mixture containing $\alpha,\alpha,\alpha'$-trimethoxy-p-xylene (purity 87.5% by weight) obtained in Preparation Example 4, 121.9 g (1.3 mols) of phenol and 0.17 g of diethyl sulfate were placed in a reaction vessel equipped with a stirrer, a thermometer, a partial condenser and a total condenser, and the resultant mixture was subjected to a crosslinking reaction with stirring, while maintained at about 140° C. Methanol formed during the reaction was removed through a vent line from the system. After the reaction was carried out for about 2 hours, unreacted phenol was removed by vacuum distillation, and the remaining resinous product in the reactor was cooled. The thus obtained reaction product which was a reddish brown solid was ground in a dry atmosphere to form a light red fine powder resin. This resin had a softening point of 110° C (in accordance with JIS K-2548). This resin is named a resin G.

EXAMPLES 8 to 13

Raw materials (in Examples 8 to 12, there were used the same aralykl ether mixture as in Example 7) and catalysts shown in Table 3 were used and the same procedure as in Example 7 was carried out to synthesize resins. The resultant resins were named resins H to L.

The aralykl ether mixture containing $\alpha,\alpha,\alpha'$-trimethoxy-p-xylene having a purity of 86% by weight obtained in Preparation Example 5 was used in Example 13, and the same procedure as in Example 7 was carried out to synthesize a resin. The thus obtained resin was named a resin M. Reaction conditions and softening points of the obtained resins are set forth in Table 3.

100 parts by weight of each of these resins G to M were uniformly mixed with 12 parts by weight of the hexamine to obtain a powder. The curing reactivity of this powder at 160° C. was evaluated by the use of a 16R type curelasto meter. The obtained results are set forth in Table 3. Furthermore, heat resistance of each powder was evaluated under the same conditions as in Example 1. The obtained results are set forth in Table 3. As is apparent from Table 3, the phenolic resins of the present invention have excellent heat resistance and curing resistivity.

TABLE 3

|  | Ex. 7 | Ex. 8 | Ex. 9 |
| --- | --- | --- | --- |

TABLE 3-continued

|  |  |  |  |
|---|---|---|---|
| Content (%) of α,α,α'-trimethoxy-p-xylene in Aralkyl Ether Mixture | 87.5 | 87.5 | 87.5 |
| Weight (g) of Aralkyl Ether Mixture | 50 | 50 | 50 |
| Mol (a) of Aromatic Nucleus in Aralkyl Ether Mixture | 0.26 | 0.26 | 0.26 |
| Phenolic Compound | phenol | o-cresol | phenol |
| Mol (b) of Phenolic Compound | 1.3 | 1.3 | 2.6 |
| Molar Ratio (b)/(a) | 5 | 5 | 10 |
| Catalyst | diethyl sulfate | diethyl sulfate | diethyl sulfate |
| Amount (g) of Catalyst | 0.17 | 0.19 | 0.29 |
| Reaction Temperature (°C.) | 140 | 140 | 140 |
| Reaction Time (hr) | 2 | 2 | 2 |
| Softening Point of Resin | 110 | 115 | 103.8 |
| Name of Resin (Kind of Resin) | G | H | I |
| Amount of Hexamine (wt % to resin) | 12 | 12 | 12 |
| Curing Rate[3] | 10.6 | 9.8 | 11.2 |
| Weight Reduction (%) at 500° C. | 16.3 | 16.7 | 17.1 |

|  | Ex. 10 | Ex. 11 |
|---|---|---|
| Content (%) of α,α,α'-trimethoxy-p-xylene in Aralkyl Ether Mixture | 87.5 | 87.5 |
| Weight (g) of Aralkyl Ether Mixture | 50 | 50 |
| Mol (a) of Aromatic Nucleus in Aralkyl Ether Mixture | 0.26 | 0.26 |
| Phenolic Compound | phenol | phenol |
| Mol (b) of Phenolic Compound | 1.3 | 2.6 |
| Molar Ratio (b)/(a) | 5 | 10 |
| Catalyst | PTS[1] | methanesulfonic acid |
| Amount (g) of Catalyst | 0.17 | 0.14 |
| Reaction Temperature (°C.) | 160 | 130 |
| Reaction Time (hr) | 3 | 4 |
| Softening Point of Resin | 109.5 | 104.2 |
| Name of Resin (Kind of Resin) | J | K |
| Amount of Hexamine (wt % to resin) | 12 | 12 |
| Curing Rate[3] | 10.8 | 11.0 |
| Weight Reduction (%) at 500° C. | 16.6 | 17.3 |

|  | Ex. 12 | Ex. 13 |
|---|---|---|
| Content (%) of α,α,α'-trimethoxy-p-xylene in Aralkyl Ether Mixture | 70[2] | 86.0 |
| Weight (g) of Aralkyl Ether Mixture | 50 | 50 |
| Mol (a) of Aromatic Nucleus in Aralkyl Ether Mixture | 0.26 | 0.26 |
| Phenolic Compound | phenol | phenol |
| Mol (b) of Phenolic Compound | 2.6 | 2.6 |
| Molar Ratio (b)/(a) | 10 | 10 |
| Catalyst | diethyl sulfate | diethyl sulfate |
| Amount (g) of Catalyst | 0.29 | 0.17 |
| Reaction Temperature (°C.) | 140 | 140 |
| Reaction Time (hr) | 2 | 2 |
| Softening Point of Resin | 95 | 102 |
| Name of Resin (Kind of Resin) | L | M |
| Amount of Hexamine (wt % to resin) | 12 | 12 |
| Curing Rate[3] | 12.3 | 11.5 |
| Weight Reduction (%) at 500° C. | 17.5 | 16.9 |

Notes:
[1] PTS was p-toluenesulfonic acid.
[2] The adjustment to 70% was made by adding 10 g of α,α'-dimethoxy-p-xylene to 40 g of 87.5% α,α,α'-trimethoxy-p-xylene.
[3] The curing rate was a full cure time (minutes) measured by the curelasto meter.

COMPARATIVE EXAMPLE 3

It was attempted to synthesize a resin in accordance with the same procedure as in Example 7 except that the amount of phenol was 36.7 g (0.39 mol). However, about 30 minutes after the start of the reaction, a gel-like substance was formed and therefore the reaction was interrupted.

EXAMPLES 14 to 19

50 g (0.24 mol in terms of the total amount of aromatic nuclei) of a α,α,α'-trichloro-p-xylene mixture (in Examples 14 to 18, there was used the mixture having a purity of 90% by weight obtained in Preparation Example 1, and in Example 19, there was used the mixture having a purity of 89% by weight obtained in Preparation Example 2), 112.9 g (1.2 mols) or 225.8 g (2.4 mols) of phenol (only in Example 15, 1.2 mols of cresol were used) and each catalyst shown in Table 4 were placed in a reaction vessel equipped with a stirrer, a thermometer, a partial condenser and a total condenser, and the resultant mixture was then subjected to a crosslinking reaction with stirring, while maintained at each temperature shown in Table 4. Hydrochloric acid formed during the reaction was removed from the system. After the solution was stirred for about 2 hours, unreacted phenol was removed by vacuum distillation, and the remaining resinous product in the reactor was cooled. The thus obtained reaction products which were reddish brown solids were ground in a dry atmosphere to form light red fine powder resins. These resins had softening points shown in Table 4 (in accordance with JIS K-2548). These resins were named resins N to S.

100 parts by weight of each of the thus obtained resins N to S were uniformly mixed with 12 parts by weight of the hexamine to form a powder. The curing reactivity of this powder at 160° C. was evaluated by the use of a JSR type curelasto meter. The obtained results are set forth in Table 4. Furthermore, the heat resistance of this powder was measured under the same conditions as in Example 1, and the obtained results are set forth in Table 4. As is apparent from Table 4, the phenolic resins of the present invention are excellent in the heat resistance and curing reactivity.

COMPARATIVE EXAMPLE 4

It was attempted to synthesize a resin in accordance with the same procedure as in Example 14 except that the amount of phenol was 36.7 g (0.39 mol). However, about 30 minutes after the start of the reaction, a gel-like substance was formed and therefore the reaction was interrupted.

EXAMPLES 20 to 27

50 g (0.36 mol in terms of the total amount of aromatic nuclei) of an aromatic composition containing 85% by weight of p-hydroxymethylbenzaldehyde obtained in Preparation Example 7, phenol or o-cresol and an acidic catalyst such as diethyl sulfate were placed in a reaction vessel equipped with a stirrer, a thermometer, a partial condenser and a total condenser, and the resultant mixture was then subjected to a crosslinking reaction with stirring, while heated. Water formed during the reaction was removed through a vent line from the system. After the solution was stirred for about 2 hours, unreacted phenol was removed by vacuum distillation, and the remaining resinous product in the reactor was cooled. The resultant reaction products which were reddish brown solids were ground in a dry atmosphere to form light red fine powder resins. These resins were named resins T to Z and ZZ, and softening points thereof were measured (in accordance with JIS K-2548).

Furthermore, 100 parts by weight of each of the resins T to Z and ZZ were uniformly mixed with 12 parts by weight of the hexamine to form a powder, and the curing reactivity and heat resistance of the powder at 160° C. were evaluated under the same conditions as in Example 1. The obtained results are set forth in Table 5 together with polymerization conditions of the resins T to Z and ZZ. As is apparent from Table 5, these phenolic resins T to Z and ZZ have excellent heat resistance and curing reactivity.

COMPARATIVE EXAMPLE 5

It was attempted to synthesize a resin in accordance with the same procedure as in Example 20 except that the amount of phenol was 50.82 g (0.54 mol). However, about 30 minutes after the start of the reaction, a gel-like substance was formed and therefore the reaction was interrupted.

TABLE 4

|  | Ex. 14 | Ex. 15 | Ex. 16 |
|---|---|---|---|
| Content (%) of $\alpha,\alpha,\alpha'$-trichloro-p-xylene in Chlorinated Mixture | 90 | 90 | 90 |
| Weight (g) of Chlorinated Mixture | 50 | 50 | 50 |
| Mol (a) of Aromatic Nucleus in Chlorinated Mixture | 0.24 | 0.24 | 0.24 |
| Phenolic Compound | phenol | o-cresol | phenol |
| Mol (b) of Phenolic Compound | 1.2 | 1.2 | 2.4 |
| Molar Ratio (b)/(a) | 5 | 5 | 10 |
| Catalyst | diethyl sulfate | diethyl sulfate | diethyl sulfate |
| Amount (g) of Catalyst | 0.16 | 0.18 | 0.28 |
| Reaction Temperature (°C.) | 140 | 140 | 140 |
| Reaction Time (hr) | 2 | 2 | 2 |
| Softening Point of Resin | 109.5 | 114 | 104.0 |
| Name of Resin (Kind of Resin) | N | O | P |
| Amount of Hexamine (wt % to resin) | 12 | 12 | 12 |
| Curing Rate[1] | 11.3 | 10.0 | 12.1 |
| Weight Reduction (%) at 500° C. | 17.3 | 16.9 | 17.2 |

|  | Ex. 17 | Ex. 18 | Ex. 19 |
|---|---|---|---|
| Content (%) of $\alpha,\alpha,\alpha'$-trichloro-p-xylene in Chlorinated Mixture | 90 | 90 | 89.0 |
| Weight (g) of Chlorinated Mixture | 50 | 50 | 50 |
| Mol (a) of Aromatic Nuclei in Chlorinated Mixture | 0.24 | 0.24 | 0.24 |
| Phenolic Compound | phenol | phenol | phenol |
| Mol (b) of Phenolic Compound | 1.2 | 2.4 | 2.4 |
| Molar Ratio (b)/(a) | 5 | 10 | 10 |
| Catalyst | none | methane-sulfonic acid | diethyl sulfate |
| Amount (g) of Catalyst | 0 | 0.14 | 0.16 |
| Reaction Temperature (°C.) | 160 | 130 | 130 |
| Reaction Time (hr) | 3 | 4 | 4 |
| Softening Point of Resin | 108.5 | 104.0 | 102 |
| Name of Resin (Kind of Resin) | Q | R | S |
| Amount of Hexamine (wt % to resin) | 12 | 12 | 12 |
| Curing Rate[1] | 20.5 | 12.9 | 11.2 |
| Weight Reduction (%) at 500° C. | 16.3 | 17.0 | 17.3 |

Note:
[1] The curing rate was a full cure time (minutes) measured by the curelasto meter.

TABLE 5

|  | Ex. 20 | Ex. 21 | Ex. 22 |
|---|---|---|---|
| Content (%) of p-hydroxymethylbenzaldehyde in Aromatic Mixture | 85.0 | 85.0 | 85.0 |
| Weight (g) of Aromatic Mixture | 50 | 50 | 50 |
| Mol (a) of Aromatic Nuclei in Aromatic Mixture | 0.36 | 0.36 | 0.36 |
| Phenolic Compound | phenol | o-cresol | phenol |
| Mol (b) of Phenolic Compound | 1.8 | 1.8 | 3.6 |
| Molar Ratio (b)/(a) | 5 | 5 | 10 |
| Catalyst | diethyl sulfate | diethyl sulfate | diethyl sulfate |
| Amount (g) of Catalyst | 0.22 | 0.24 | 0.39 |
| Reaction Temperature (°C.) | 140 | 140 | 140 |
| Reaction Time (hr) | 2 | 2 | 2 |
| Softening Point of Resin | 108 | 117 | 102.1 |
| Name of Resin (Kind of Resin) | T | U | V |
| Amount of Hexamine (wt % to resin) | 12 | 12 | 12 |
| Curing Rate[3] | 12.5 | 10.9 | 13.2 |
| Weight Reduction (%) at 500° C. | 17.8 | 14.9 | 18.1 |

|  | Ex. 23 | Ex. 24 | Ex. 25 |
|---|---|---|---|
| Content (%) of p-hydroxymethylbenzaldehyde in Aromatic Mixture | 85.0 | 85.0 | 68[2] |
| Weight (g) of Aromatic Mixture | 50 | 50 | 50 |
| Mol (a) of Aromatic Nuclei in Aromatic Mixture | 0.36 | 0.24 | 0.27 |
| Phenolic Compound | phenol | phenol | phenol |
| Mol (b) of Phenolic Compound | 1.8 | 3.6 | 2.6 |
| Molar Ratio (b)/(a) | 5 | 10 | 10 |
| Catalyst | PTS[1] | methane-sulfonic acid | diethyl sulfate |
| Amount (g) of Catalyst | 0.22 | 0.19 | 0.29 |
| Reaction Temperature (°C.) | 160 | 130 | 140 |
| Reaction Time (hr) | 3 | 4 | 2 |
| Softening Point of Resin | 110.5 | 102.8 | 93 |
| Name of Resin (Kind of Resin) | W | X | Y |
| Amount of Hexamine (wt % to resin) | 12 | 12 | 12 |
| Curing Time[3] | 11.9 | 13.0 | 11.1 |
| Weight Reduction (%) at 500° C. | 17.6 | 17.8 | 16.0 |

|  | Ex. 26 | Ex. 27 |
|---|---|---|
| Content (%) of p-hydroxymethylbenzaldehyde in Aromatic Mixture | 85.0 | 85.0 |
| Weight (g) of Aromatic Mixture | 50 | 50 |
| Mol (a) of Aromatic Nuclei in Aromatic Mixture | 0.36 | 0.36 |

TABLE 5-continued

| Phenolic Compound | phenol | phenol |
|---|---|---|
| Mol (b) of Phenolic Compound | 0.9 | 9.0 |
| Molar Ratio (b)/(a) | 2.5 | 2.5 |
| Catalyst | diethyl sulfate | diethyl sulfate |
| Amount (g) of Catalyst | 0.15 | 0.50 |
| Reaction Temperature (°C.) | 140 | 140 |
| Reaction Time (hr) | 2 | 2 |
| Softening Point of Resin | 115 | 85 |
| Name of Resin (Kind of Resin) | Z | ZZ |
| Amount of Hexamine (wt % to resin) | 12 | 12 |
| Curing Time[3] | 10.1 | 14.0 |
| Weight Reduction (%) at 500° C. | 15.1 | 17.5 |

Notes:
[1]PTS was p-toluenesulfonic acid.
[2]The adjustment to 68% was made by adding 10 g of p-xylylene glycol to 40 g of 85% p-hydroxymethylbenzaldehyde.
[3]The curing rate was a full cure time (minutes) measured by the curelasto meter.

What is claimed is:

1. A method for preparing a phenolic resin having a good curing reactivity which comprises the step of reacting a trifunctional aromatic compound represented by the formula

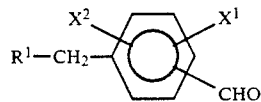

wherein $R^1$ is a hydroxyl group, a halogen atom or a lower alkoxy group having 3 or less carbon atoms, and each of $X^1$ and $X^2$ is independently a hydrogen atom, a halogen atom or an alkyl group with a phenolic compound in a ratio of 1 mol of the trifunctional aromatic compound to 2-30 mols of the phenolic compound.

2. The method according to claim 1 wherein said trifunctional aromatic compound is alkoxymethylbenzaldehyde or hydroxymethybenzaldehyde.

3. The method according to claim 1 wherein said phenolic compound is phenol or cresol, and said reaction is carried out in the presence of an acidic catalyst.

4. The method according to claim 1 wherein said condensation reaction is carried out in the presence of an acid catalyst between a hydrolyzate of halogenated xylene having at least 60 mol % (in terms of aromatic nuclei) of hydroxymethylbenzaldehyde and said phenolic compound.

5. A phenolic resin obtained in accordance with said method described in claim 1.

6. The phenolic resin according to claim 5 wherein the number average molecular weight of said phenolic resin is in the range of from 350 to 2000.

7. The phenolic resin of claim 5 wherein the resin is prepared by conducting a condensation reaction in the presence of an acid catalyst between a hydrolyzate of halogenated xylene having at least 60 mol % (in terms of aromatic nuclei) of hydroxymethylbenzaldehyde and said phenolic compound.

8. The phenolic resin according to claim 7 wherein the number average molecular weight of said phenolic resin is in the range of from 350 to 2000.

9. The phenolic resin according to claim 8 wherein said phenolic compound is phenol.

* * * * *